United States Patent [19]

Rothschild et al.

[11] Patent Number: 5,431,492
[45] Date of Patent: Jul. 11, 1995

[54] DRAIN SYSTEM FOR SLANT TOP VIDEO GAME CABINETS

[75] Inventors: Wayne H. Rothschild, Wheeling; Gregory J. Tastad, Stone Park, both of Ill.

[73] Assignee: WMS Gaming, Inc., Chicago, Ill.

[21] Appl. No.: 122,217

[22] Filed: Sep. 17, 1993

[51] Int. Cl.⁶ .......................... A47F 9/00; A47B 77/06
[52] U.S. Cl. ..................... 312/229; 312/7.2; 312/296; 49/476.1
[58] Field of Search ............... 312/7.2, 229, 296, 328; 220/344; 49/476.1

[56] References Cited

U.S. PATENT DOCUMENTS

| 477,758 | 6/1892 | Huss | 312/229 |
|---|---|---|---|
| 649,851 | 5/1900 | Levine | 312/229 |
| 1,963,089 | 6/1934 | Henderson | 312/296 |
| 3,210,144 | 10/1965 | Ullman, Jr. et al. | 312/229 |
| 3,933,400 | 1/1976 | Helgeson | 312/229 X |
| 4,756,580 | 7/1988 | Middleton, Jr. | 312/7.2 |

Primary Examiner—Laurie K. Cranmer
Assistant Examiner—Rodney B. White
Attorney, Agent, or Firm—Rockey, Rifkin and Ryther

[57] ABSTRACT

The invention consists of a slant top cabinet for a video game where the video monitor is located beneath a door. The side edges of the door mate with gutters such that liquid spilled into the seam of the door will drain into the gutters away from the monitor. A rubber seal is attached to and surrounds the monitor such that liquid spilled on the screen or game top will drain into the rubber seal. The rubber seal includes a port that connects to a conduit for draining liquid from the rubber seal away from the monitor.

4 Claims, 4 Drawing Sheets

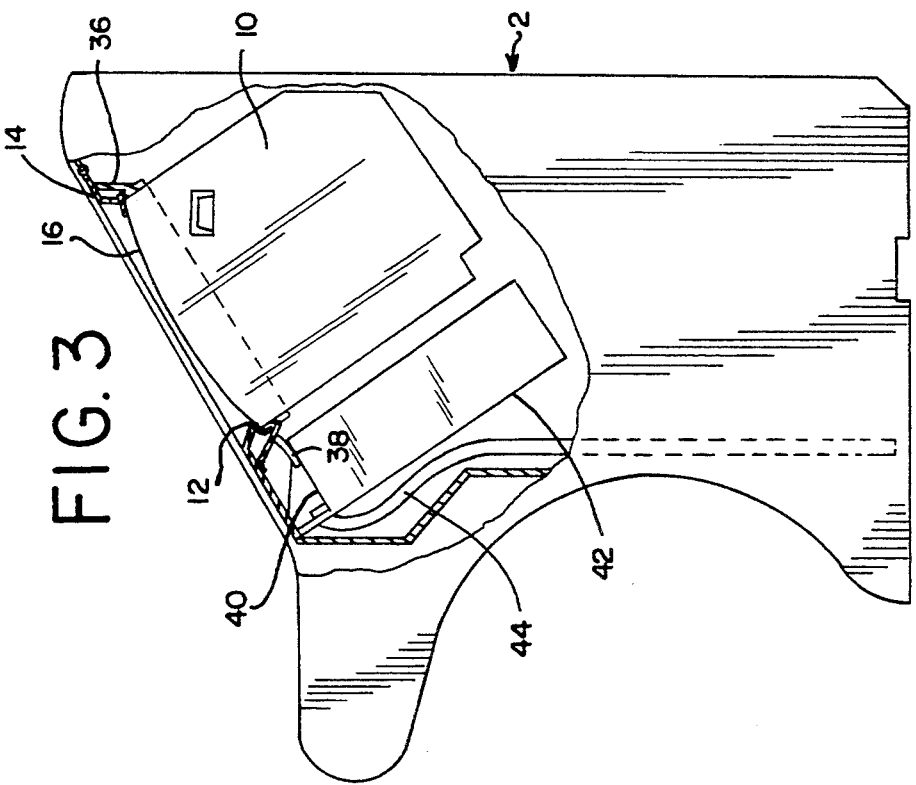
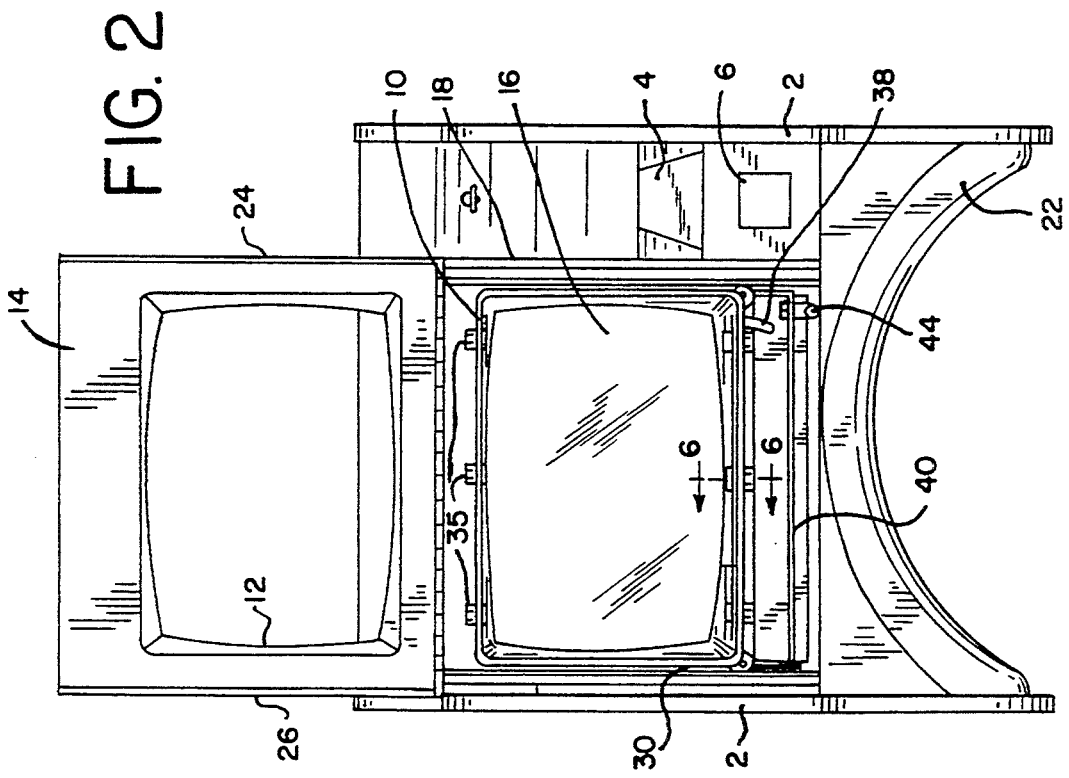

DRAIN SYSTEM FOR SLANT TOP VIDEO GAME CABINETS

BACKGROUND OF THE INVENTION

The invention relates, generally, to video game machines and, more particularly, to a liquid drain system for isolating the video monitor.

Video games typically consist of a game cabinet supporting a video monitor and a plurality of player operated buttons. The video monitor displays a game as directed by the game program and the player manipulates buttons to control play of the game. The player operated buttons can consist of mechanical buttons located on the cabinet or video "buttons" displayed on the monitor for screen touch control or both. Where screen touch control is used, the video monitor screen must be exposed to allow the game player to touch the screen. It is necessary in applications using screen touch control to isolate the monitor and other game electronics from the external environment to prevent electrical hazards.

Video game machines are used to play a wide variety of games including sports and fantasy games in arcades and the like. Video games have also become widely used in casinos and other legalized gambling sites for playing video poker, blackjack, keno and the like. In some video games the video monitor is arranged with its screen substantially vertical; however, in the machines used in gambling games the monitors are more typically arranged with the screen at approximately a 30° angle relative to the horizontal. In these so-called "slant top" games, the player sits in front of the machine with the video screen and cabinet top oriented like a desk.

A particular problem with slant top games that use screen touch control is that game players often spill drinks on the game and video screen. Because video monitors operate at high voltage, the seepage of liquid into the electronics of the game presents a safety hazard.

Thus, a video game cabinet that protects the video monitor and game electronics from liquid is desired.

SUMMARY OF THE INVENTION

The invention consists of a slant top cabinet for a video game where the video monitor is located beneath a door having an aperture formed thereon exposing the video monitor screen. The side edges of the door mate with gutters formed on the game cabinet such that liquid spilled into the seam between the door and the cabinet will drain into the gutters and be conveyed away from the monitor. Moreover, a rubber seal is attached to and surrounds the monitor, The rubber seal engages the cover when it is closed such that liquid spilled on the screen or game cabinet will drain into the rubber seal, The rubber seal includes a port that connects to a conduit for draining liquid from the rubber seal away from the monitor and game electronics,

BRIEF DESCRIPTION OF THE DRAWINGS

FIG. 2 is a top view of the video game of the invention with the top of the cabinet open.

FIG. 3 is a side view of the video game of the invention with the cabinet broken away to show the monitor.

DETAILED DESCRIPTION OF THE INVENTION

Figure 1:
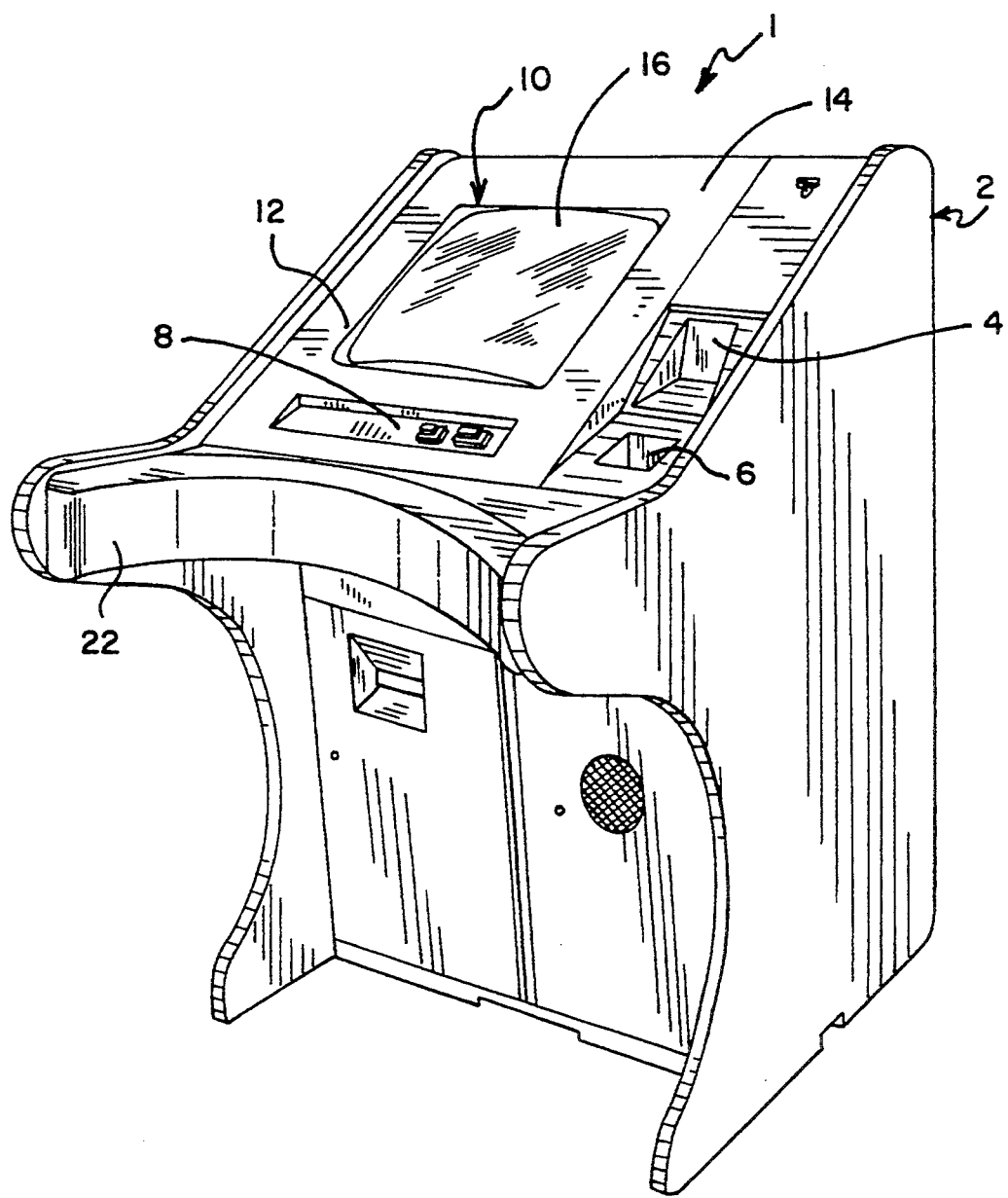
FIG. 1 is a perspective view of the slant top video game of the invention.

Referring more particularly to FIG. 1, the slant top video game machine of the invention is shown generally at 1 consisting of video game cabinet 2 having a dollar bill validator 4, pay off trough 6 and player operated buttons 8, if required. The cabinet 2 is preferably dimensioned such that the game player sits in a chair with the cabinet 2 arranged like a desk.

A video monitor 10 is supported by cabinet 2 such that its screen 16 is exposed through window 12. Window 12 is an aperture in door 14 such that the screen 16 is exposed to the external environment and is visible to the player as best shown in FIGS. 1 through 4. The screen is exposed to allow screen touch control where player operated "buttons" are displayed on the screen. Because the screen 14 is exposed via window 12, any liquid spilled on the top of cabinet 2 can contact the screen and, absent the drain system of the invention seep between the screen and the door 14 to the electronics of the monitor and the other game electronics creating a hazardous situation.

Figure 4:
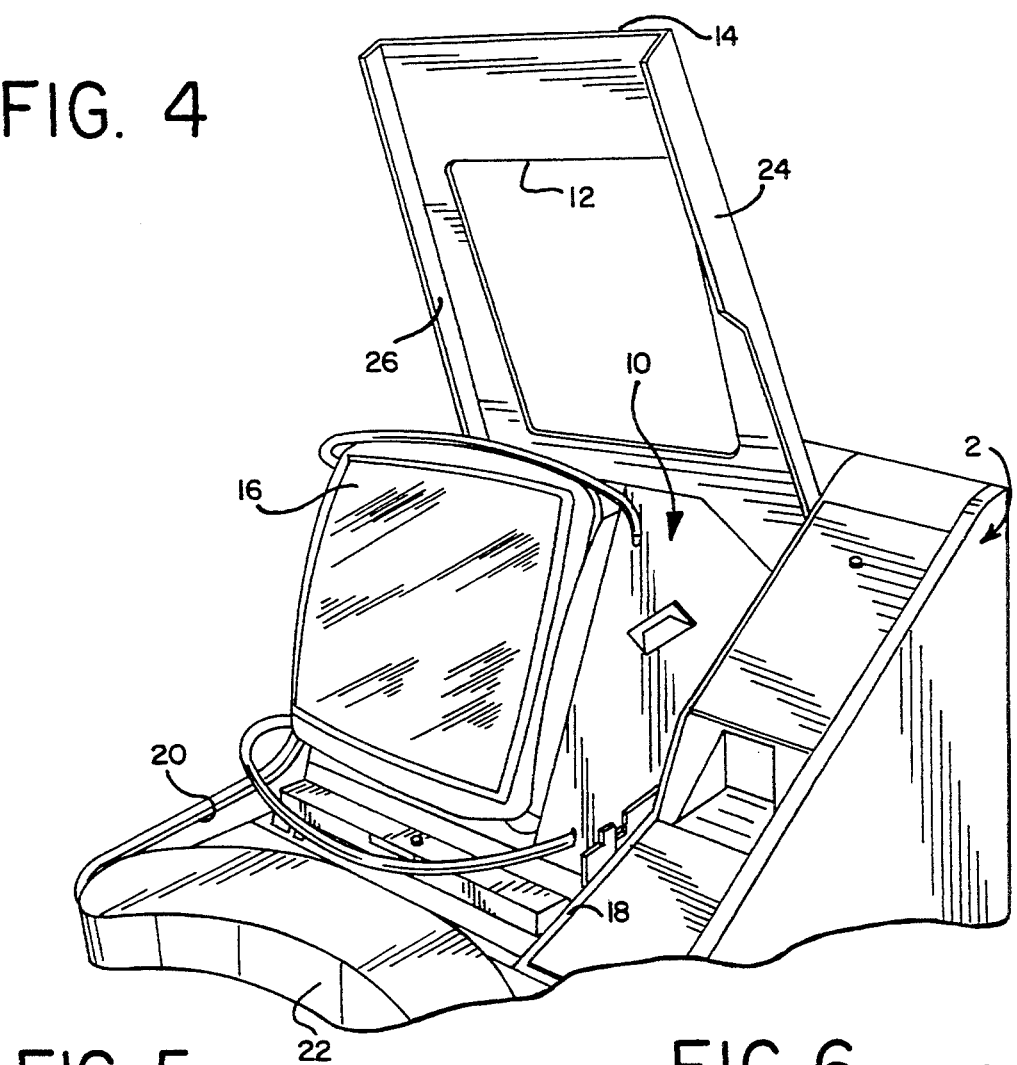
FIG. 4 is a perspective view similar to that of FIG. 1 with the top of the cabinet open.

To eliminate this hazard, the drain system of the invention includes a first gutter 18 that extends from the top of cabinet 2 to the arm rest 22 on one side of monitor 10 (FIGS. 2 and 4). Gutter 18 is arranged such that the flange 24 of door 14 extends into it. A second gutter 20 extends from the top of the cabinet to arm rest 22 on the opposite side of monitor 10. Gutter 20 is arranged such that flange 26 of door 14 extends into gutter 20. As a result, any fluid spilled at the seams between door 14 and cabinet 2 will drain into gutters 18 and 20 and will be delivered away from monitor 10 and will be dumped outside of cabinet 2 in the space between the arm rest 22 and the top of the cabinet.

Figure 5:
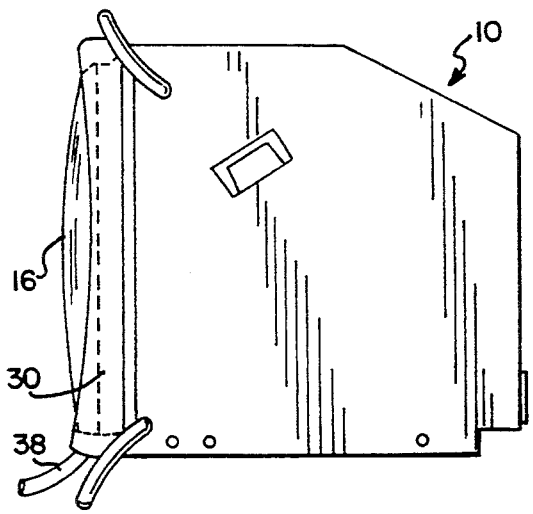
FIG. 5 is a side view of the video monitor of the invention.
Figure 6:
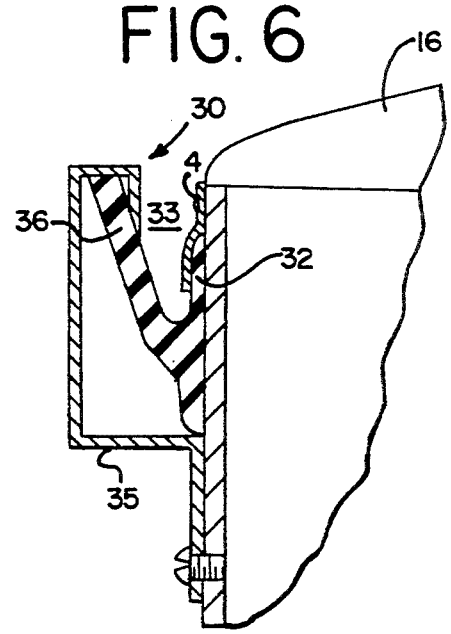
FIGS. 6 and 7 are partial section views showing the engagement of the seal with the cabinet door.
Figure 7:
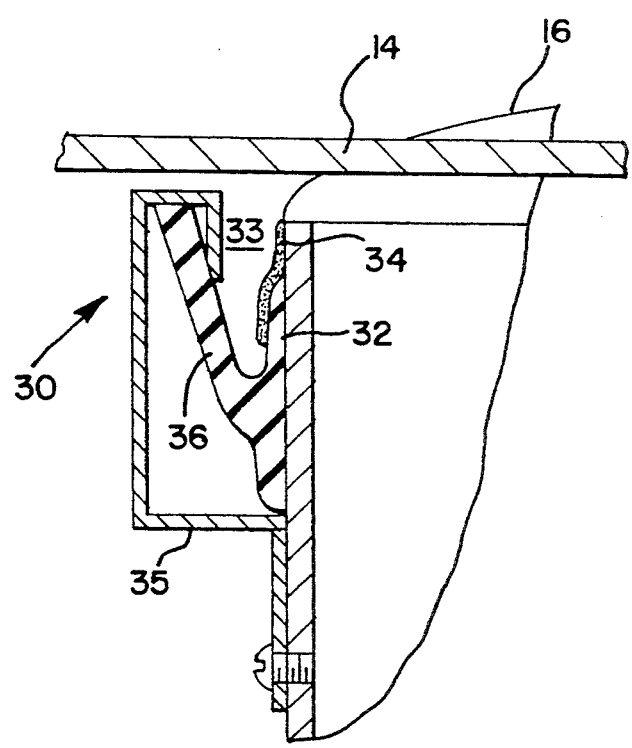

The drain system of the invention further includes a flexible seal 30 fixed to the periphery of monitor 10 as best shown in FIGS. 5, 6 and 7. The seal is constructed of neoprene or other suitable material and has a substantially v-shape where a first leg 32 of seal 30 is secured to the monitor by, for example, water proof tape 34. Other suitable securement means such as glue can be used if desired. A plurality of brackets 35 secured to the monitor 10 hold the second leg 36 of the seal 30 to maintain the legs in spaced relationships. As best shown in FIG. 6, leg 36 extends beyond the edge of monitor 10. As a result, any liquid spilled on screen 16 will run off of the screen (because the screen has a generally convex shape) and into the trough 33 formed between legs 32 and 36 thereby preventing fluid from reaching the electronics of the video monitor or other game electronics located inside of cabinet 2.

Because the monitor 10 is inclined relative to the horizontal as best shown in FIG. 3, any fluid entering seal 30 will flow to the area of the seal at the bottom of the monitor. To remove the fluid from the seal, one end of a flexible conduit 38 communicates with seal 30 such that the fluid will drain from the seal through conduit 38 as best shown in FIGS. 2, 3 and 5.

The opposite end of conduit 38 delivers the fluid to a receptacle 40 mounted on the logic drawer 42. Logic drawer 42 is removable and contains the electronic circuitry for controlling operation of the video game. The receptacle 40 is mounted to logic drawer 42 by welding or other suitable securement means such that fluid delivered thereto will be contained therein and will not contact the electrical components. A second conduit 44 communicates with receptacle 40 to drain the fluid therefrom. The second conduit passes through the game cabinet 2 and terminates externally thereto to discharge the fluid outside of the game and away from the internal electronics. The receptacle 40 is inclined toward conduit 44 such that the fluid delivered thereto will flow toward the corner of the receptacle having conduit 44 as best shown in FIG. 2.

Thus, the seal and drain system of the invention prevents liquid spilled on the cabinet or screen from contacting the electronics of the monitor and the other game electronics while allowing the video screen to be exposed thereby permitting touch screen controls to be used.

While the invention has been described in some detail with reference to the figures, it will be appreciated that numerous changes in the details and construction of the device can be made without departing from the spirit and scope of the invention.

What is claimed is:

1. A seal and drain system for a video game machine, comprising:
   a) a game cabinet including a door movable between a closed position and open position, said door having an aperture located therein;
   b) a video monitor including a video screen supported in the cabinet with the screen exposed through said aperture;
   c) a seal surrounding and secured to said video monitor, said seal contacting said door when it is in the closed position, said seal including a means for collecting fluid spilled on the machine and for preventing the fluid from contacting the video monitor; and
   d) means for receiving the fluid from said means for collecting and for delivering the fluid to a location external of the cabinet.

2. The seal and drain system according to claim 1 wherein the seal has a substantially v-shape in cross section having a first leg fixed to the screen and a second leg extending from the first leg, a trough being created between the first leg and second leg for receiving fluid therein.

3. The seal and drain system according to claim 1, wherein when the door is in the closed position a seam is created between the door and the rest of the cabinet, and further including a gutter located below the seam to collect fluid from entering the cabinet via said seam.

4. The seal and drain system according to claim 3, wherein said door includes a flange that engages the gutter.

* * * * *